Jan. 12, 1932. H. A. STAPLES 1,841,350
TUBE DRAWING MACHINE
Filed Sept. 29, 1930 2 Sheets-Sheet 1
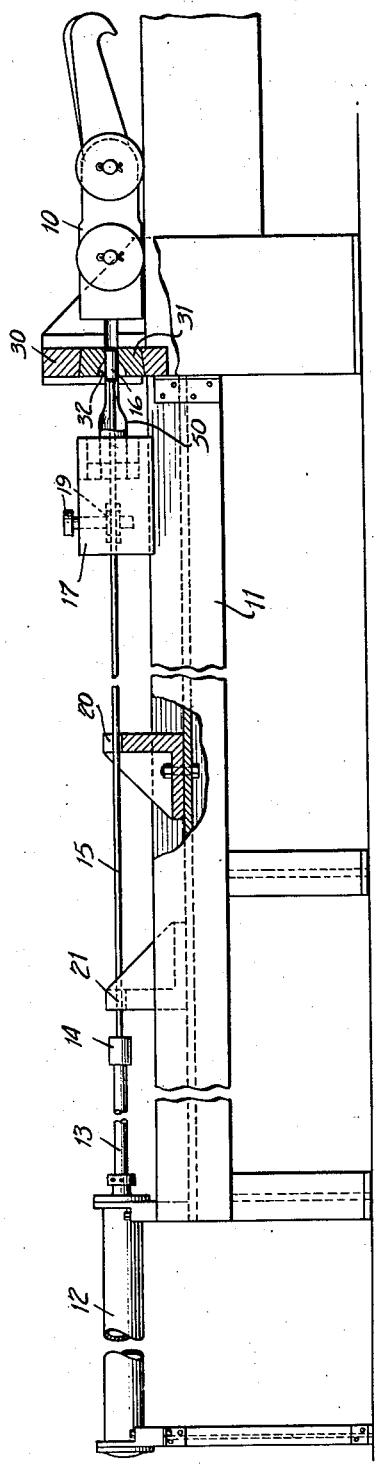
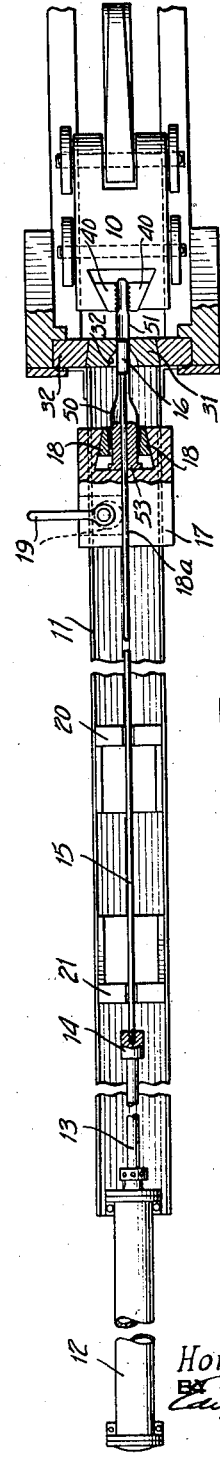
INVENTOR
Horace A. Staples
ATTORNEY

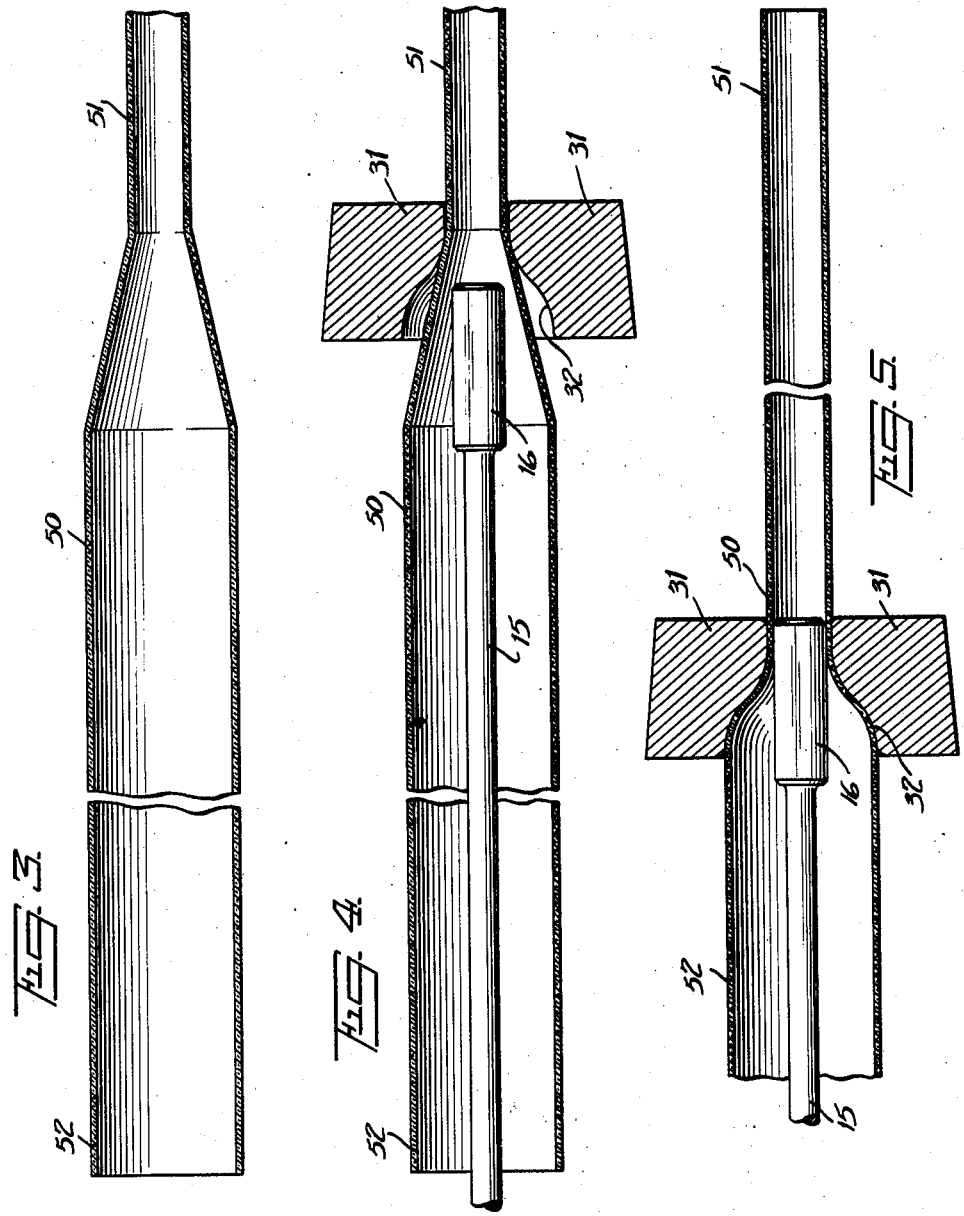

Patented Jan. 12, 1932

1,841,350

UNITED STATES PATENT OFFICE

HORACE A. STAPLES, OF PLAINFIELD, NEW JERSEY, ASSIGNOR TO NATIONAL ELECTRIC PRODUCTS CORPORATION, OF NEW YORK, N. Y., A CORPORATION OF DELAWARE

TUBE DRAWING MACHINE

Application filed September 29, 1930. Serial No. 485,110.

My invention relates to a method of producing tubes with enlarged ends, or ends of special shape, more particularly to tubes for condensers and/or heat exchangers that require a tube of two diameters with uniform or varying wall thickness and has for its object the production of a tube drawing machine that may be conveniently and economically handled to produce these tubes on a production basis.

The foregoing and other features of my invention will now be described in connection with the accompanying drawings forming part of this specification in which I have shown my tube drawing machine in its preferred form, after which I shall point out in the claims those features which I believe to be new and of my own invention.

In the drawings:

Figure 1 is a side elevation of my tube drawing machine.

Figure 2 is a top view of same.

Figure 3 is a section of my tube swedged on the end ready for drawing.

Figure 4 is a diagrammatic section showing the relative positions of die, plug, triblet rod and tube at the beginning of the drawing operation.

Figure 5 is a diagrammatic section showing the relation of the die, plug, triblet rod and tube at the end of the drawing operation.

In carrying out my invention I employ a standard draw bench tongs 10 mounted for reciprocating movement at one end of draw bench 11. On the opposite end of the bench I employ a pull back cylinder 12 operated by air or water. This pull back cylinder is provided with a piston 13 furnished with a chuck 14 or other similar means for holding triblet bar 15. This triblet bar 15 is provided on its outer end with a plug 16.

Mounted to slide on the bench 11 is a carriage 17 carrying the jaws 18 of the tongs. The carriage 17 is provided with an opening 18a through which the triblet bar 15 freely passes but which may be locked therein when desired by the clamp 19.

On the bench 11 is provided a stop 20 which is located to limit the movement of the carriage 17. I also provide a holder 21 for the triblet rod, which is also a stop for the chuck 14.

On the end of the bench 11 adjacent the draw bench tongs 10 I provide a holder 30 in which dies 31 are rigidly held. The face of the die 32 can be any shape but the standard ogee section is preferred.

The draw bench tongs are provided with gripping jaws 40 standard to tongs of this character.

The carriage 17 may be moved synchronously with the pull back of the triblet rod or it may be moved independently with an independent air or hydraulic cylinder or mechanical chain.

The operation of my machine is as follows:—

The tube to be drawn 50 is swedged to shape as shown in Figure 3 which provides a small end 51 adapted to be gripped by jaws 40 of the draw bench tongs 10.

The triblet rod 15 is drawn to left at its extreme end, the carriage 17 is adjacent its stop 20. The machine is now ready to receive the tube 50. The swedged end 51 is passed through the die 31 and locked with the jaws 40 of the draw bench tongs. The opposite end of the tube 52 is gripped by the jaws 18 in the tongs mounted on carriage 17. A plug 53 may be inserted in the large end of the tube to prevent possible collapse where exceptionally thin wall tubing is drawn.

The triblet rod 15 is then passed through the tube 50 until it arrives at the position substantially shown in Figure 4. We are now ready to draw the tube which is accomplished by moving the draw bench tongs 10 to the right. This forms the tube 50 as shown in Figure 5, the enlarged end assuming the shape of the die face 32.

The tube having been drawn the desired length the clamp 19 may be now operated to lock the carriage 17 to the triblet rod 15 and by means of the pull back cylinder the tube, triblet rod and carriage are moved to the left until the carriage comes against the stop 20; the triblet bar continues to move which withdraws the jaws 18 and releases the tube 50.

That completes the cycle of operation and the machine is ready for the next tube.

I wish it distinctly understood that my tube drawing machine herein described and illustrated is in the form in which I desire to construct it and that changes or variations may be made as may be convenient or desirable without departing from the salient features of my invention and I therefore intend the following claims to cover such modifications as naturally fall within the lines of invention.

I claim:

1. A draw tube bench in combination, a bench provided on one end with a draw bench tongs adapted for longitudinal movement to and from the end of the bench providing means for drawing a tube and on the other end a pull back cylinder adapted to reciprocate a triblet rod, a triblet rod provided with a plug on the end away from the cylinder, a die mounted on the end of the bench adjacent the draw bench tongs, a carriage adapted to slide over the triblet rod and provided with pull back tongs adapted to grip the end of the tube opposite that engaged by the draw bench tongs, a stop on the bench to limit the movement of the carriage and to release the pull back tongs, and a clamp on the carriage to affix the carriage to the triblet bar.

2. A draw tube bench in combination, a bench provided with draw bench tongs on one end thereof and pull back cylinder for operating a triblet rod on the opposite end, a triblet rod reciprocated longitudinally by said cylinder, a carriage provided with means for gripping the tube on the opposite end gripped by the draw bench tongs and mounted for reciprocation on the bench, said triblet rod passing through the carriage; means on the carriage to grip the triblet rod so that the carriage may be moved therewith.

In testimony whereof I affix my signature.

HORACE A. STAPLES.